United States Patent Office 3,551,234
Patented Dec. 29, 1970

3,551,234
REPAIR METHOD FOR GLASS LINED VESSELS
Orson J. Britton, Pittsford, N.Y., assignor to Sybron Corporation, a corporation of New York
Filed Oct. 11, 1967, Ser. No. 674,483
Int. Cl. B32b *35/00*
U.S. Cl. 156—98                                           3 Claims

ABSTRACT OF THE DISCLOSURE

A method of repairing a defect in the coating of a glass coated metallic vessel by first grinding away a portion of the glass at the defect then counterboring, also by grinding, the sound glass adjacent the ground away portion to form an annular seat in the glass coating, the seat having a concave bottom which forms a cement reservoir and then cementing a glass disc in the seat so that the exposed surface of the disc is flush and substantially coplanar with the surface of the glass coating.

BACKGROUND OF THE INVENTION

The present invention relates to glass or viterous enamel coated apparatus, such as tanks, reactors, agitators, baffles and the like, and more specifically to the method of repairing defects in the coatings of such articles.

Glass lined equipment has found wide acceptance in the chemical industry due to the high resistivity of glass to corrosion and abrasion. In some cases, however, glass is selected not for its corrosion or abrasion resistance but because sticky products are less likely to adhere to glass and to other materials. For example, certain polymer reactions which are either non or only mildly corrosive are conducted in glassed equipment because the polymers adhere much less readily to glass than to even highly polished metals.

While glass is the preferred coating for polymerizing vessels, this does not mean that the polymers will not adhere to the glass. The polymers do adhere to the glass coating and at times the build up of polymer on the coating proceeds so rapidly that the vessel must be cleaned as frequently as several times a week. A common cleaning method is to empty the vessel and scrape the polymer from the glass coating with a hard plastic or metal scraping tool. The failure to clean the vessels results in the loss of heat transfer through the walls of the vessel. Furthermore, failure to remove the polymer adhering on the glass and permitting an excessive build up of polymer can even result in the polymer, which shrinks as it dries, pulling sections of the glass coating away from the base metal.

The smoothness of the glass coating is one factor which determines the speed at which the polymer builds up on the coating. Any irregularly or roughness in the coating acts as a catching point which attracts the polymer and detracts from the ability of the coating as a whole to resist the adherence of the polymer. For this reason, the smoothness of the glass coating of the vessels used in polymerization reactions is of primary concern and this quality of the equipment must be rigorously controlled in order to meet the high standards of coating smoothness set by users of such vessels. It is considered much more difficult in the art to produce an acceptable coating for polymerizing vessels than, for example, a vessel for use in a severe chemical environment since any roughness which would not affect the corrosion or abrasion resistance of the coating will detract from the ability of the coating to resist the adherence and build up of polymer.

These problems of maintaining the smoothness of the glass coating are highlighted whenever it is necessary to repair some defect in the coating which occurs after the vessel has been placed in service. Any such defect, as for example, the development of a pit or break in the glass, is detrimental to a polymerizing vessel in two ways; first, the defect roughens the surface of the coating, and secondly, the polymer will adhere rapidly to the exposed base metal. Short of reglassing the entire vessel, which is not possible in the field, several prior art methods have been developed for making in the field repairs to defects in glassed equipment.

However, while these repair methods are able to withstand chemical attack and to some extent are abrasion resistant, none of these prior art methods are completely acceptable for use in repairing polymerizing vessels. For example, one method of repair as shown in the E. A. Sanford et al. Pat. No. 2,631,360 uses a plug made from a noncorrosive metal such as tantalum which is placed over the defect and attached to the base metal of the vessel wall with a nut and bolt. This method, while suitable for withstanding corrosive attack exposes metal to the polymerization reaction and as set out hereinabove polymer adheres very readily to any metal.

Another method of repair as shown in the O. J. Britton et al. Pat. No. 2,917,819 uses a glass coated plug which is also placed over the defect and attached to the base metal of the vessel wall. While this patent does show a repair method which exposes a glass coated surface to the polymerization reaction, the plug protrudes from the surface of the glass coating and the protuberance itself provides a base about which the polymer can adhere. Furthermore, since both these types of repairs employ a plug which upstands from the surface of the glass coating, the scraping process for cleaning the vessels is hindered, and there is an ever present danger of the glass coating on the plug or on the vessel wall cracking when the plug is hit with a metal scraper.

Another common method of repair, as shown in the A. Grant Pat. No. 2,722,734, uses a gold inlay to repair a defect in the glass coating. The gold inlay has the advantage of being flush with the surface of the glass coating, but again this method of repair exposes a metal to the polymerization reaction.

SUMMARY OF THE INVENTION

In the present invention, a defect in the coating of a glass coated metallic vessel is repaired by grinding away a portion of the coating to remove the defect and to form an annular seat in the undamaged coating, the seat having a concave bottom and an annular side wall which extends perpendicular to the surface of the glass coating. A glass disc is then cemented in the seat, the concave bottom of the seat acting as a reservoir for cement so that the surface of the disc can be made flush with the surface of the surrounding coating.

OBJECTS OF THE INVENTION

One object of my invention is to provide a method for repairing glass coated articles which is particularly useful where the articles are used in connection with certain plastic materials which tend to adhere to metallic surfaces and build up thereon.

Another object of my invention is to provide a method for repairing glass coated apparatus in which the repair is effected without the use of metal coupling devices or attachments.

Yet another object of my invention is to provide a method for repairing glass coated apparatus in which the surface of the repair is coplanar with the surface of the surrounding glass coating.

A further object of my invention is to provide a method for repairing glass coated apparatus in which the repair is effected by a glass patch.

DESCRIPTION OF THE PREFERRED EMBODIMENT

Figure 1:
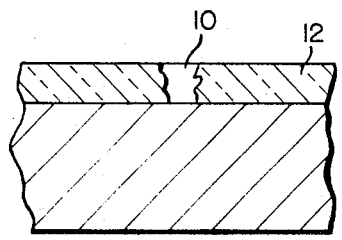
FIG. 1 is a sectional view of a portion of an article such as a vessel wall having a metal base and a glass coating containing a pitted portion to be repaired.
Figure 2:
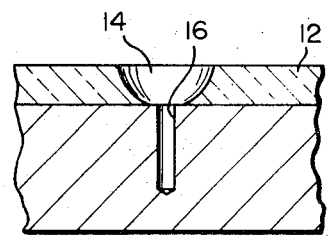
FIG. 2 is similar to FIG. 1, only showing the glass ground away from the pitted portion and a hole drilled into the base metal.
Figure 3:
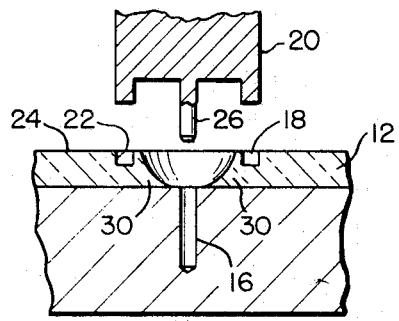
FIG. 3 is a view showing a straight sided annular groove ground in the sound coating surrounding the ground away portion.

In accordance with the method of my invention, when a pit or break 10 (FIG. 1) in the coating 12 of a glass or vitreous enamel lined vessel is discovered, the glass adjacent the pit or break is preferably removed by grinding to leave the surrounding glass in a sound condition. As shown in FIG. 2, the grinding is preferably continued until a section of base metal 14 is uncovered so that a pilot hole 16 can be drilled into the base metal adjacent the center of the ground away portion. As shown in FIG. 3, the next step of the method is to grind an annular groove 18 in the undamaged coating surrounding the ground away portion with a special tool indicated generally at 20. For purposes set forth hereinbelow, it is important that the outer side wall 22 of the groove is substantially perpendicular to the surface 24 of the surrounding coating. For this reason tool 20 is provided with a pilot 26 which is received and guided by pilot hole 16.

Figure 4:
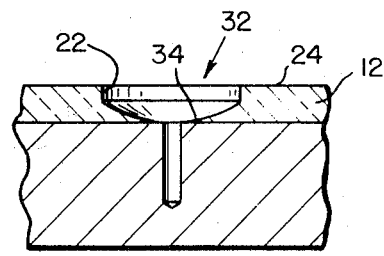
FIG. 4 is a view showing the finished seat formed in the glass coating.

After the annular groove 18 has been ground, the portion of the glass coating indicated at 30 which lies between the annular groove and the ground away portion is removed by hand grinding to form a seat generally indicated at 32 (FIG. 4). The seat is formed with concave bottom 34 and an annular side wall 22 upstanding from the periphery of the concave bottom and extending generally normal to the surface 24 of the surrounding coating.

Figure 5:
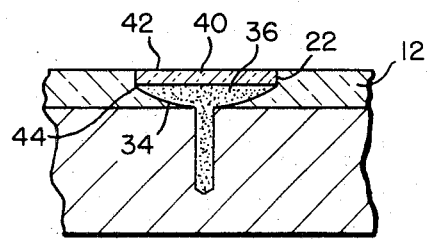
FIG. 5 is a view showing the glass disc cemented in place to effect the repair.

The seat 32 and pilot hole 16 are then filled with any suitable cement such as an epoxy or silicone cement 36 (FIG. 5) and a glass disc 40 is positioned in the seat. It is important that the thickness of the glass disc should not be greater than the depth of side wall 22 of the seat so that the exposed surface of the disc will not protrude above the surface of the surrounding coating. The optimum situation occurs where the glass disc can be positioned so that the top surface 42 of the disc will be coplanar with the surface of the surrounding coating thereby forming a substantially smooth continuous glass surface. In the optimum situation, the thickness of the glass disc is exactly the depth of the annular wall 22 of the seat. In this respect, the lower edge 44 of the glass disc will rest adjacent the bottom edge of annular wall 22 and the concave bottom 34 of the seat will form a reservoir directly beneath the disc for holding the cement used to attach the disc to glass coating 12. Moreover, the diameter of the disc should be made as close as possible to the diameter of the seat so that there will not be an excessive amount of cement exposed between the periphery of the glass disc and the periphery of the seat.

Thus, it will be appreciated that the present invention accomplishes its intended object providing a method for repairing glass coated articles used in connection with polymerization reactions. The repair which is effected is flat and coplanar with the surrounding glass surface and there is no protuberance about which polymer can adhere and accumulate. Moreover, the absence of a protuberance makes it easier to scrape the entire glass surface of the vessel when it is necessary to remove the accumulated polymer. Moreover, since the repair is effected with a glass material the polymer is less likely to adhere to the repair than to a similar repair made with a metal article.

While I have described the preferred embodiments of my invention, it will become apparent that various modifications can be made therein without changing the spirit and scope of the invention as set out in the appended claims.

Having described my invention in detail, what I claim as new is:

1. A method of repairing a discontinuity in the coating of a glass-coated metallic article comprising the steps of:
    (a) grinding away the glass at said discontinuity to expose a portion of said base metal;
    (b) drilling a pilot hole in said base metal at said ground-away portion;
    (c) grinding a straight sided annular groove in the undamaged coating surrounding said ground-away portion while employing said pilot hole to receive and center a grinding tool having a central pilot pin loosely fitting said hole;
    (d) grinding away a portion of the undamaged glass coating containing the inside diameter of said groove to form a seat in said glass surface said seat having a generally concave base surface with an annular side wall formed by the outside diameter of said groove upstanding from the periphery of said base and extending substantially perpendicular to the surface of said coating; and
    (e) cementing a glass disc in said seat with the lower surface of said disc being supported at its periphery by said concave seat base adjacent said upstanding side wall, the lower surface of said disc and said concave seat base forming a space therebetween for receiving a cement and the exposed surface of said glass disc being substantially planar with the surface of said coating so as to form a substantially smooth continuous glass surface.

2. A method as set forth in claim 1 in which said glass disc has a thickness substantially equal to but not greater than the depth of said annular wall and a diameter substantially equal to the diameter of said seat.

3. A method as set forth in claim 2 in which said cementing step is accomplished by filling said concave base with cement to expose substantially the entire bottom surface of said glass disc to said cement.

References Cited

UNITED STATES PATENTS

| | | | |
|---|---|---|---|
| 276,499 | 4/1883 | Story | 156—98 |
| 2,917,819 | 12/1959 | Britton et al. | 29—401 |

BENJAMIN A. BORCHELT, Primary Examiner

S. C. BENTLEY, Assistant Examiner

U.S. Cl. X.R.

29—401; 65—28